(12) United States Patent
Schwegler et al.

(10) Patent No.: US 6,513,501 B1
(45) Date of Patent: Feb. 4, 2003

(54) FLAT TUBULAR PRESSURE DAMPER FOR DAMPING FLUID PRESSURE PULSATIONS IN FLUID LINES

(75) Inventors: Helmut Schwegler, Pleidelsheim (DE); Martin Maier, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 48 days.

(21) Appl. No.: 09/787,760

(22) PCT Filed: Jul. 11, 2000

(86) PCT No.: PCT/DE00/02251

§ 371 (c)(1), (2), (4) Date: May 11, 2001

(87) PCT Pub. No.: WO01/07776

PCT Pub. Date: Feb. 1, 2001

(30) Foreign Application Priority Data

Jul. 22, 1999 (DE) .......................................... 199 34 357

(51) Int. Cl.⁷ .............................................. F02M 41/00
(52) U.S. Cl. ...................................... 123/463; 123/447
(58) Field of Search ................................. 123/463, 447, 123/456, 461, 497, 506

(56) References Cited

U.S. PATENT DOCUMENTS

| 4,861,238 A | * | 8/1989 | Kamiyama et al. | 138/123 |
| 5,617,827 A | * | 4/1997 | Eshleman et al. | 123/456 |
| 5,896,843 A | * | 4/1999 | Lorraine | 123/447 |
| 6,418,909 B2 | * | 7/2002 | Rossi et al. | 123/456 |

FOREIGN PATENT DOCUMENTS

| DE | 3842298 | * | 6/1990 |
| GB | 890895 | * | 3/1962 |

* cited by examiner

*Primary Examiner*—Willis R. Wolfe
*Assistant Examiner*—Mahmoud Gimie
(74) *Attorney, Agent, or Firm*—Ronald E. Greigg

(57) ABSTRACT

The invention relates to a flat tubular damper for damping fluid pressure pulsations in fluid lines, in particular fuel pressure pulsations in fuel supply lines of motor vehicles, having at least one elongated chamber whose cross section is small in comparison to its longitudinal span and at least a part of whose chamber wall, being operationally connected with the fluid, can be elastically deformed by the fluid pressure pulsations. The invention provides that the cross section of the chamber changes continuously or discretely along its longitudinal span.

8 Claims, 3 Drawing Sheets

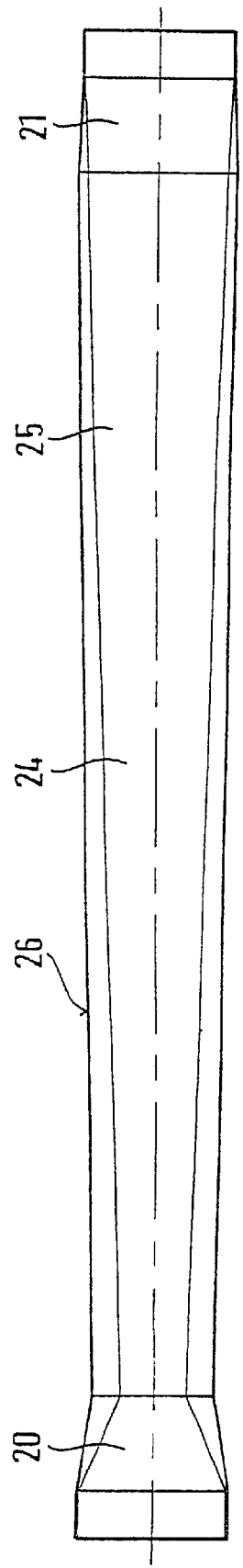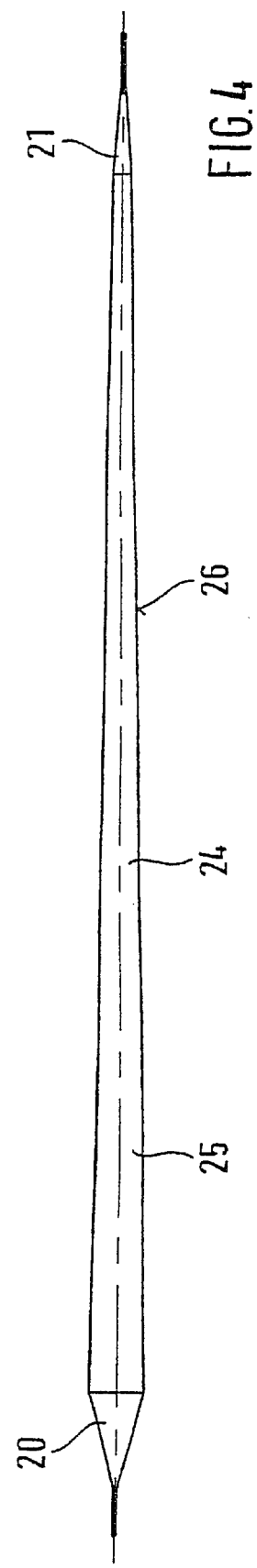

FLAT TUBULAR PRESSURE DAMPER FOR DAMPING FLUID PRESSURE PULSATIONS IN FLUID LINES

CROSS-REFERENCE TO RELATED APPLICATIONS

This application is a 35 USC 371 application of PCT/DE 00/02251 filed on Jul. 11, 2000.

BACKGROUND OF THE INVENTION

1. Field of the Invention

The invention is directed to a fluid pressure damper, and more particularly to a flat tubular pressure damper for damping fluid pressure pulsations in fluid lines and to a fuel supply line embodying such a pressure line.

2. Description of the Prior Art

DE 44 31 770 A1 has disclosed a pressure pulsation damper for a fuel pump of an internal combustion engine which damps the pressure pulsations in the fuel produced by the fuel pump. The pressure pulsation damper is an elongated, thin-walled tube which is contained in a cage and is clamped and closed at the ends in order to form at least one chamber which contains a gas at a supra-atmospheric pressure. The chamber absorbs and damps the pressure pulsations and noise produced by the fuel pump by virtue of the fact that the chamber wall constituted by the tube deforms elastically and transmits the pulsations to the gas cushion inside the chamber. Due to the elastic deformation of the chamber and the resulting compression of the gas cushion, pulsation energy is lost, as a result of which the pressure pulsations are damped. The cross section of the chamber is constant along its longitudinal span and is small in comparison to this longitudinal span.

The known pressure pulsation damper has the disadvantage that due to its constant cross section, an effective damping is limited to a particular spectrum of excitation frequencies. Determining this spectrum and making corresponding structural and manufacturing adaptations of the pressure pulsation damper to the respective pulsations prevailing in the fuel, however, is time-consuming and expensive. On the other hand, because of the constant cross section of the pressure pulsation damper, there is a natural frequency, with corresponding harmonics. When the natural frequency or its multiple coincides with the excitation frequency of the pressure pulsations in the fuel or with the speed of the internal combustion engine, resonance pulsations with large oscillation amplitudes are produced, as a result of which the damping action of the pressure pulsation damper is sharply limited and undesirable noise is produced in the fuel system. Even if the pressure pulsation damper is designed so that its natural frequency lies outside the excitation range of the fuel system or the engine speed, even slight changes in the fuel system of the kind that occur in the course of a product's life cycle, e.g. a change of the fuel line length or of the line material, the excitation spectrum can be shifted once again into the range of the resonance frequency.

SUMMARY OF THE INVENTION

A flat tubular damper for damping fluid pressure pulsations according to the invention has the advantage over the prior art that an effective damping is produced for a wide spectrum of pulsation excitation frequencies, which is achieved by means of a continuous or discrete changing of its cross section. The damping action of the flat tubular damper is no longer selectively limited to particular excitation frequencies since the individual sections with different cross sections react to different excitation frequencies. The flat tubular damper according to the invention can therefore be universally used for different fuel system configurations or fluid line system configurations. Since there is no longer a constant cross section, there is also no pronounced natural frequency that could give rise to resonance problems.

In a particularly preferable embodiment, the chamber is comprised of a thin-walled, originally cylindrical tubular body made of sheet steel, whose ends are closed and which is pressed flat along its longitudinal axis to different degrees lateral to the longitudinal axis. As a result, the flat tubular damper can be economically produced and is at the same time sturdy, durable, and reliable.

BRIEF DESCRIPTION OF THE DRAWINGS

The foregoing and other features and advantages will be apparent from the detailed description contained below, taken in conjunction with the drawings, in which:

FIG. 3 is a top view of the flat tubular damper from FIG. 2, and FIG. 4 is a side view of the flat tubular damper from FIG. 2.

DESCRIPTION OF THE PREFERRED EMBODIMENT

A flat tubular damper 1 is proposed, which is for damping fluid pressure pulsations in fluid lines, in particular of fuel pressure pulsations in fuel supply lines of motor vehicles.

Figure 1:
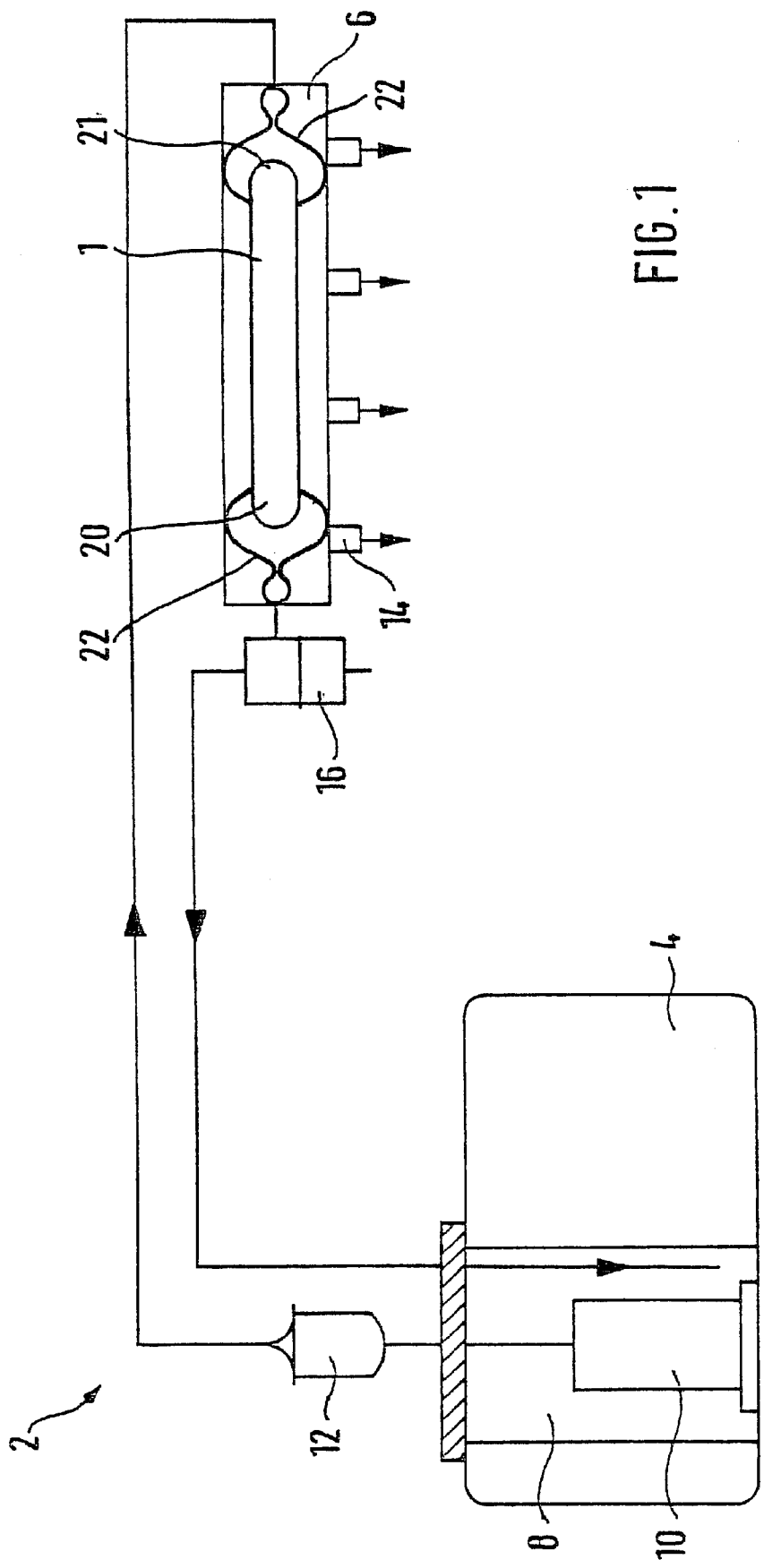
FIG. 1 schematically depicts a fuel delivery apparatus with a preferred embodiment of a flat tubular damper according to the invention.

FIG. 1 is a simplified, schematic depiction of a fuel delivery apparatus 2 in which fuel is supplied from a tank 4 to a tubular fuel distributor 6 of an internal combustion engine that is not otherwise shown. To this end, a tank installation unit 8 with a fuel pump 10 is disposed in the tank 4. A fuel filter 12 is disposed between the fuel pump 10 and the fuel distributor 6. Fuel is distributed to injection valves 14 in an intrinsically known fashion in the fuel distributor 6. The fuel is supplied at one end of the fuel distributor 6 while at the other end, fuel that has not been injected is returned to the tank 4 via a pressure regulator 16. Alternatively, the fuel delivery apparatus 2 can also be embodied without a return; in such a case, the pressure regulator 16 is disposed in the tank installation unit 8 and the atmospheric pressure is used as a reference pressure.

On the inside of the fuel distributor 6, the flat tubular damper 1 according to the invention is disposed for example horizontally; its two ends 20, 21 are grasped by clamps 22 fastened to the ends of the fuel distributor 6 so that the flat tubular damper 1 is secured spaced radially and axially apart from the inner wall of the fuel distributor 6 and is essentially completely encompassed by fuel.

Figure 2:
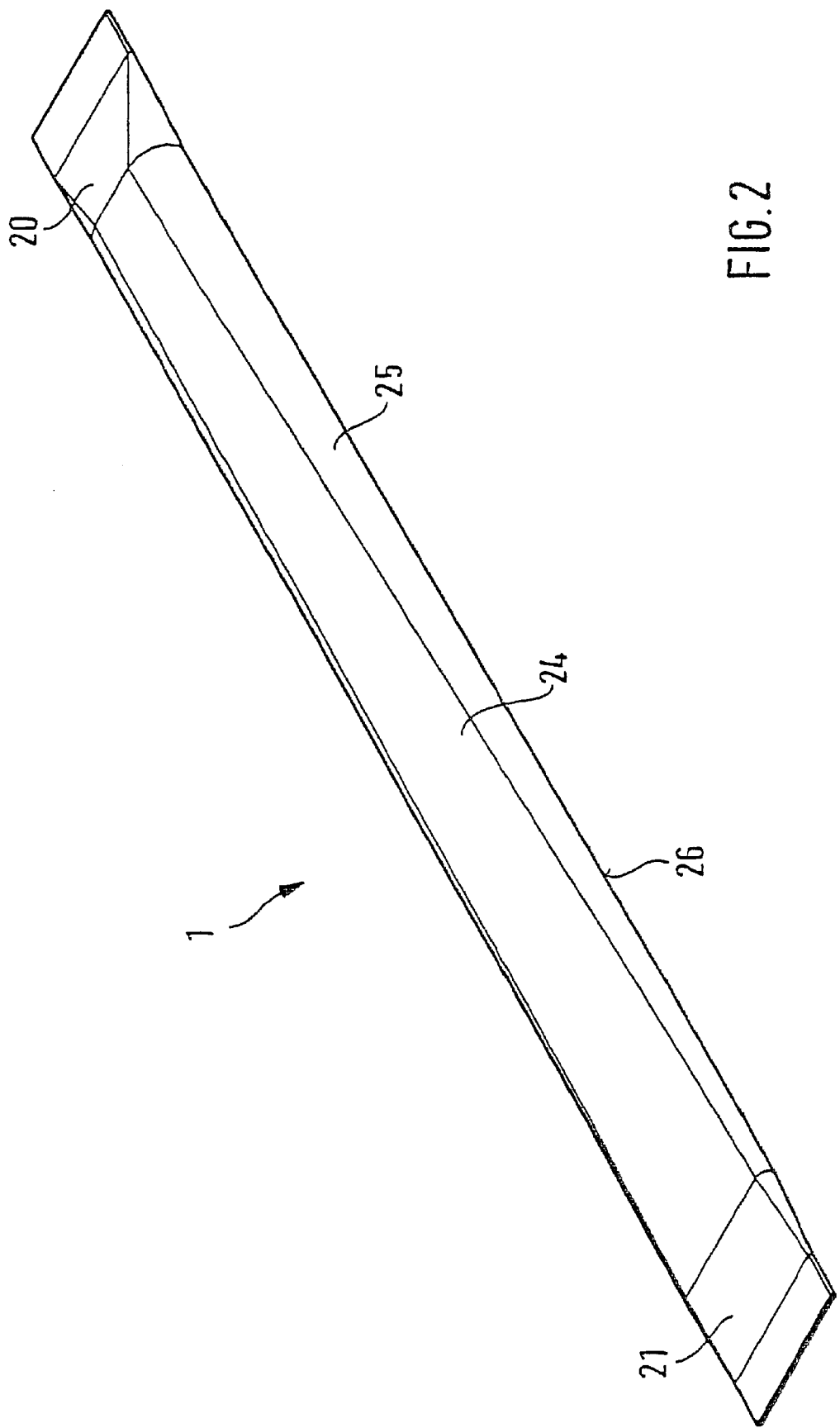
FIG. 2 is an isometric depiction of the flat tubular damper from FIG. 1.

According to the flat tubular damper 1 shown in detail in FIGS. 2 to 4, each of its two ends 20, 21 is preferably individually tapered and closed in order to constitute a pressure-tight chamber 24. The cross section of the chamber 24 is small in comparison to its longitudinal span and in turn tapers continuously from one end 20 to the other end 21. The non-constant cross sectional course of the chamber 24 is produced, for example, when an originally cylindrical tubular body 25 made of sheet steel is pressed flat along its longitudinal axis to different degrees lateral to the longitudinal axis, as is particularly shown in FIG. 4, or when the tubular body is embodied as slightly conical along its longitudinal axis and is pressed uniformly flat lateral to its longitudinal axis. Alternatively, instead of changing continuously, the cross sectional course of the chamber 24 could also change discretely by virtue of the fact that sections with different cross sections are disposed sequentially in the longitudinal span of the flat tubular damper 1.

The wall thickness of the chamber wall 26 is slight, as a result of which it can be deformed in an elastic fashion when acted upon by fuel pressure pulsations in the fuel distributor 6 that are caused by switching pulsations of the injection valves 14. In this manner, oscillation energy is taken out of the system, which results in the desired damping of the fuel pressure pulsations. Due to the elongated form of the chamber 24, when it is subjected to pressure, it chiefly deforms lateral to its longitudinal span.

The chamber 24 can be filled exclusively with a gaseous medium, preferably air at atmospheric pressure, or can also be filled with a fluid medium such as oil so that the chamber 24 cannot collapse when there are severe pressure impacts. Alternatively, the chamber 24 can also be filled with any other gas and/or another fluid medium. Instead of only one chamber 24, a number of elongated chambers can also be provided, each with a non-constant cross sectional progression, which are for example of different lengths and are disposed in series with one another in an oscillation-decoupled manner. If a flat tubular damper with a number of chambers is used, the operational reliability increases because in the event that one chamber fails, a damping is still provided by the remaining chambers. In addition, this encourages the broadening of the damping action of the flat tubular damper 1 already achieved by the non-constant cross sectional progression of the chambers to the widest possible frequency range since the individual chambers correspond to different frequencies due to their different lengths.

The use of the flat tubular damper 1 according to the invention is not limited to fuel carrying lines, but can be use to damp pressure pulsations in any kind of fluid line. In the exemplary embodiment according to FIG. 1, the use of the flat tubular damper 1 in a fuel injection system of a mixture-compressing internal combustion engine with externally supplied ignition is described.

The foregoing relates to preferred exemplary embodiments of the invention, it being understood that other variants and embodiments thereof are possible within the spirit and scope of the invention, the latter being defined by the appended claims.

We claim:

1. A flat tubular damper (1) for damping fluid pressure pulsations in fluid lines, in particular fuel pressure pulsations in fuel supply lines (6) of motor vehicles, comprising at least one elongated chamber (24) whose cross section is small in comparison to its longitudinal span and at least a part of whose chamber wall (26), being operationally contacted by the fluid to be damped and being capable of being elastically deformed by the fluid pressure pulsations, the cross section of the chamber (24) changing continuously or discretely along its longitudinal span, wherein the chamber (24) is embodied as a thin-walled tubular body (25) made of sheet steel, whose ends (20, 21) are closed.

2. The flat tubular damper according to claim 1, wherein that the cross section of the chamber (24) continuously tapers from its one end (20) to its other end (21).

3. The flat tubular damper according to claim 2, wherein the tubular body is embodied as conical in relation to its longitudinal axis and is pressed flat in a direction lateral to the longitudinal axis.

4. The flat tubular damper according to claim 2, wherein the tubular body (25) is originally cylindrical in shape and is pressed flat lateral to the longitudinal axis to different degrees along its longitudinal axis.

5. A fuel supply line (6) containing at least one flat tubular damper (1) according to claim 1.

6. A fuel supply line (6) containing at least one flat tubular damper (1) according to claim 2.

7. A fuel supply line (6) containing at least one flat tubular damper (1) according to claim 3.

8. A fuel supply line (6) containing at least one flat tubular damper (1) according to claim 4.

\* \* \* \* \*